(12) United States Patent
Gaberthüel et al.

(10) Patent No.: US 11,204,270 B2
(45) Date of Patent: Dec. 21, 2021

(54) FLOW MEASURING DEVICE

(71) Applicant: Endress+Hauser Flowtec AG, Reinach (CH)

(72) Inventors: Stephan Gaberthüel, Oberwil (CH); Alexander Grün, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 195 days.

(21) Appl. No.: 16/063,447

(22) PCT Filed: Nov. 15, 2016

(86) PCT No.: PCT/EP2016/077760
§ 371 (c)(1),
(2) Date: Jun. 18, 2018

(87) PCT Pub. No.: WO2017/102221
PCT Pub. Date: Jun. 22, 2017

(65) Prior Publication Data
US 2018/0372522 A1 Dec. 27, 2018

(30) Foreign Application Priority Data
Dec. 18, 2015 (DE) ...................... 10 2015 122 224.8

(51) Int. Cl.
*G01F 1/684* (2006.01)
*G01F 1/69* (2006.01)
(Continued)

(52) U.S. Cl.
CPC ................ *G01F 1/69* (2013.01); *G01F 1/684* (2013.01); *G01F 15/18* (2013.01); *G01F 15/185* (2013.01); *B33Y 80/00* (2014.12); *G01F 15/14* (2013.01)

(58) Field of Classification Search
CPC . G01F 1/69; G01F 1/684; G01F 15/18; G01F 15/185
(Continued)

(56) References Cited

U.S. PATENT DOCUMENTS

2004/0216532 A1 11/2004 Koudal et al.
2005/0150290 A1 7/2005 Kawai et al.
(Continued)

FOREIGN PATENT DOCUMENTS

CN 2310983 Y 3/1999
CN 1360201 A 7/2002
(Continued)

OTHER PUBLICATIONS

Search Report for German Patent Application No. 10 2015 122 224.8, German Patent Office, dated Jul. 28, 2016, 7 pp.
(Continued)

*Primary Examiner* — John Fitzgerald
*Assistant Examiner* — Rodney T Frank
(74) *Attorney, Agent, or Firm* — Kelly J. Smith; Endress+Hauser (USA) Holding Inc.

(57) ABSTRACT

A flow measuring device comprising a measurement signal-generating sensor element and a metal connection element, especially one manufactured in a generative manufacturing method, for connecting the measurement signal-generating sensor element with an opening or sensor nozzle of a tube, where the connection element is connected with a pressure-bearing component comprising a sleeve and a wall, which extends over the entire cross section in parallel projection in the direction of a longitudinal axis of the sleeve, wherein the pressure bearing component has at least one electrical cable guide and a potting compound, wherein the potting compound fills the sleeve partially or completely, and wherein the pressure bearing component is arranged in the opening
(Continued)

or in the sensor nozzle of the tube radially behind the connection element with reference to the longitudinal axis of the tube.

9 Claims, 1 Drawing Sheet

(51) Int. Cl.
*G01F 15/18* (2006.01)
*G01F 15/14* (2006.01)
*B33Y 80/00* (2015.01)

(58) Field of Classification Search
USPC ........................................... 73/204.11
See application file for complete search history.

(56) References Cited

U.S. PATENT DOCUMENTS

| | | | | |
|---|---|---|---|---|
| 2010/0147068 A1* | 6/2010 | Neuhaus | ................ | G01F 1/74 |
| | | | | 73/204.11 |
| 2015/0027233 A1 | 1/2015 | Khalifa | | |
| 2015/0027235 A1 | 1/2015 | Khalifa | | |
| 2015/0300856 A1* | 10/2015 | Pfau | .......................... | G01P 5/12 |
| | | | | 73/204.11 |
| 2016/0327420 A1* | 11/2016 | Martin | .................... | G01F 1/688 |

FOREIGN PATENT DOCUMENTS

| | | |
|---|---|---|
| CN | 1460839 A | 12/2003 |
| DE | 7730814 U1 | 3/1981 |
| DE | 69410061 T2 | 1/1999 |
| DE | 102007010912 A1 | 9/2008 |
| DE | 202013103402 U1 | 8/2013 |
| DE | 102012108415 A1 | 6/2014 |
| DE | 102013209176 A1 | 11/2014 |
| DE | 102013013476 A1 | 2/2015 |
| DE | 102013110042 A1 | 3/2015 |
| DE | 102014101968 A1 | 8/2015 |
| EP | 0882958 A1 | 12/1998 |
| EP | 1340964 A1 | 9/2003 |
| EP | 2827108 A1 | 1/2015 |
| JP | 2013124883 A | 6/2013 |

OTHER PUBLICATIONS

Search Report for International Patent Application No. PCT/EP2016/077760, WIPO, dated Feb. 23, 2017, 14 pp.

* cited by examiner

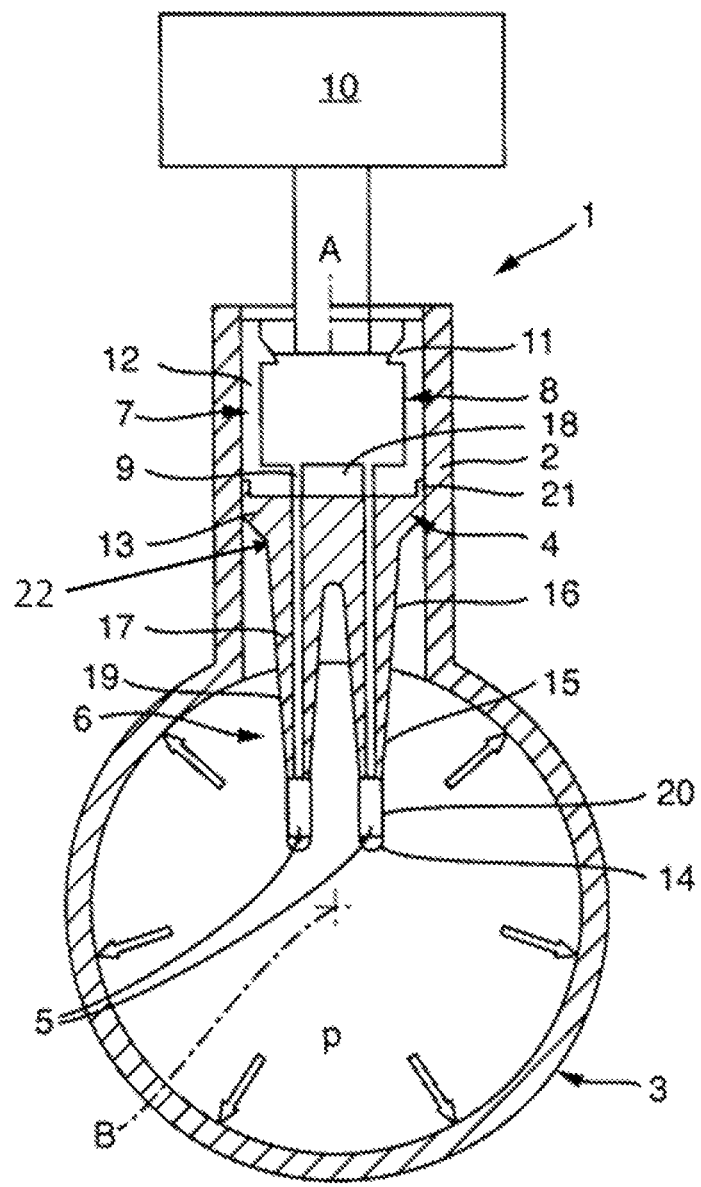

FLOW MEASURING DEVICE

CROSS-REFERENCE TO RELATED APPLICATIONS

The present application is related to and claims the priority benefit of German Patent Application No. 10 2015 122 224.8, filed on Dec. 18, 2015 and International Patent Application No. PCT/EP2016/077760 filed on Nov. 15, 2016, the entire contents of which are incorporated herein by reference.

TECHNICAL FIELD

The present invention relates to a flow measuring device as defined in the preamble of claim 1.

BACKGROUND

The structural embodiment of thermal flow measuring devices is known per se. Starting from a, most often cylindrical, hollow body with a base area, at least two cylindrical pin sleeves extend into the interior of a tube or pipe. These pins sleeves are, however, most often connected by weld seams with the cylindrical hollow body. A typical example is shown and described in DE 10 2010 061 731 A1.

Often connections at joints are created by welding. Depending on joint type, different weld seams can be applied, which have different seam- or joint forms and varied seam buildups. One distinguishes between butt- and fillet welds. In butt welds, the lines of force extend with relatively more uniform stress distribution, while in the case of fillet welds the lines of force are deflected, which leads to stress concentrations.

In the field of thermal flow measurement, the conventional procedure of joining with welding has disadvantages, since at the gap, or joint, heat transfer changes with temperature change. This can lead to measurement errors.

Therefore, manufacture in the form of a monolithic sensor housing is attractive. Components with complicated forms and with functional properties can be implemented by so-called generative manufacturing methods. Such manufacturing methods operate based on a partial or complete melting of granular material, e.g. metal powder and metal grains. Utilized for this can be e.g. the so-called SLM method. Alternatively, such monolithic components can be manufactured by means of a so-called MIM method (metal injection molding).

In the field of flow measurement, such components can be applied as connection components between measurement signal issuing sensor elements (heating apparatuses, temperature sensors, ultrasonic transducers and DSC sensors).

However, sensor housings must withstand certain pressure requirements. The sensor housing must withstand a static pressure of up to 40 bar. There are, however, concerns that components, which are not manufactured by standard methods, will not withstand such pressure requirements. This relates especially to components that were manufactured by the MIM or SLM methods.

SUMMARY

An object of the present invention, consequently, is to provide a flow measuring device having a connection component, which connects the measurement signal-generating sensor elements with a pipe or tube, thus an opening in the pipe or tube or a sensor nozzle associated with the pipe or tube, wherein the flow measuring device simultaneously fulfills the pressure requirements required for the flow measurement.

The invention achieves this object by a flow measuring device as defined in claim 1.

A flow measuring device of the invention includes a measurement signal-generating sensor element and a metal connection element, which connects the measurement signal-generating sensor element with an opening or sensor nozzle of a pipe or tube.

A flow measuring device of the invention, is preferably a thermal flow measuring device, an ultrasonic flow measuring device and/or a vortex flow measuring device.

A measurement signal-generating sensor element for a thermal flow measuring device is a heating apparatus and/or a temperature sensor for ascertaining the temperature of a measured medium. These can be, in each case, a heatable resistance thermometer, e.g. a Pt 100- or Pt 1000-element.

A measurement signal-generating sensor element is in the case of an ultrasonic flow measuring device an ultrasonic transducer, which, for example, can be embodied as a piezoelement.

A measurement signal-generating sensor element in the case of a vortex flow measuring device can be a DSC sensor.

The connection element enables the connecting of the measurement signal-generating sensor element with the pipe or tube, especially with an opening located in the tube or with a sensor nozzle. The connecting to the tube can occur through the connection element directly or through the connection element and additional components, especially a pressure bearing component.

The connection element can additionally advantageously fulfill other functions. It can, for example, be embodied in the form of a sensor housing for protection of the measurement signal-generating sensor elements. In the case of a thermal flow measuring device, the sensor housing can be embodied with two pin sleeves, which extend from a hollow body into the lumen of the tube. The sensor housing can have at least in certain regions a comparatively thin housing wall, in order to facilitate heat transfer. Usually, pin sleeves are welded to the hollow body. In the context of the present invention, however, a monolithic sensor housing, or a monolithic connection element, can be used, in the case of which the pin sleeves are connected connecting seam freely, especially weld seam freely, with the hollow body. In this way, defined heat transfers are created.

The connection element can in an additional embodiment be embodied in an ultrasonic flow measuring device as a body-sound reducing or body-sound coupling element, which lessens or removes the body sound oscillations of the ultrasonic transducer to the tube. Body-sound decoupling structures can have very complicated geometric forms, which, however, are quite manufacturable by generative manufacturing methods. For an as defined as possible force diversion, the embodiment of the aforementioned element is a monolithic, connecting seam free, connection element.

The connection element can in an additional embodiment have a stop for the paddle of a DCS sensor. This can be e.g. a cage, which is connected with the tube, e.g. the tube wall. Also, in such case, generative manufacturing methods can be used and a monolithic connecting seam free construction selected for the connection element.

The connection element is connected according to the invention with a pressure-bearing component, which is part of the flow measuring device. The pressure bearing component includes a sleeve. The sleeve can, depending on shape of the opening of the tube or of the sensor nozzle of the tube, have a variable lateral surface form. This can be e.g. a cylindrical lateral surface. However, it is also possible to provide a prismatic lateral surface. The cross section of the sleeve can be embodied e.g. circularly or rectangularly.

On or in the sleeve, a wall is arranged, which is associated with the component. The wall can be planar or rounded, even dome shaped. It extends over the entire cross section of the sleeve. The cross section does not absolutely have to lie on a plane perpendicular to the longitudinal axis of the tube, but, instead, the cross section can be a parallel projection along a plane perpendicular to the longitudinal axis. Thus, also rounded or inclined walls arranged in the sleeve form subject matter of the present invention.

The pressure bearing component includes at least one electrical cable feedthrough. This cable guide can preferably be embodied as an opening through the wall.

Additionally, the pressure bearing component includes a potting compound, wherein the potting compound fills the sleeve 12 partially or completely. The potting compound prevents the exit of measured medium from the opening and/or the sensor nozzle in the case of a material failure of the connection element under high pressure. Correspondingly, the pressure bearing component guards in the case of higher pressures, e.g. at pressures up to 40 bar, against the exit of the measured medium. For this, the pressure bearing component is arranged in the opening of the tube and/or in the sensor nozzle, with reference to the longitudinal axis of the tube, radially behind the connection element.

Preferably, the metal connection element can be manufactured in a generative manufacturing method e.g. from a granular material. The type of manufacturing method can be ascertained, as is known in the case of metal materials, based on a micrograph.

Alternatively, the metal connection element can be manufactured in a MIM method. Also in this case, the manufacturing method can be ascertained based on the micrograph.

Thus, even in the case of material failure of the connection element, an exit of the measured medium can be safely prevented.

Advantageous embodiments of the invention are subject matter of the dependent claims.

Advantageously, the flow measuring device is embodied as a thermal flow measuring device. The monolithic metal connection element can advantageously be embodied as a sensor housing of a thermal flow measuring device having a hollow body and two pin sleeves, which protrude from the hollow body.

Alternatively, the flow measuring device can be advantageously embodied as an ultrasonic flow measuring device and the monolithic metal connection element can be embodied as a body-sound reducing element, especially as a body-sound coupling element.

Likewise alternatively, the flow measuring device can be embodied as a vortex flow measuring device. The monolithic metal connection element can additionally advantageously comprise a stop for limiting the movement of a sensor paddle of a DSC sensor.

The pressure bearing component can have at least one electronic component, which is embedded in the potting compound. In this way, this component is supplementally improved as regards its shape- and stability under pressure.

Especially preferably, the monolithic metal connection element can be manufactured of a granular metal material by a generative manufacturing method or alternatively by means of a MIM-primary shaping method. Such materials permit the forming of geometrically complicated metal components. However, currently, the danger of a pressure related material failure compared with comparable components manufactured using traditional manufacturing methods is considered to be greater. In order also to provide the pressure resistance required for the flow measurement, the pressure-bearing component of the invention is used.

For additional reinforcement of the potting compound against being pressed out of the sleeve, the pressure bearing component can advantageously have ledges on the inner surface of the sleeve for anchoring the potting compound.

An especially pressure stable construction of the pressure-bearing component can be advantageously achieved by providing that the ratio of the wall thickness of the wall to the diameter of the cross section of the sleeve is preferably at least 1 to 30, especially preferably at least 1 to 10.

The electrical cable guide can be embodied at least as a hole in the wall, which hole has an average hole diameter of 0.2 to 1.5 mm.

The pressure resistant component can advantageously be welded in and/or screwed into the opening of the tube and/or the sensor nozzle.

Now, other advantageous embodiments of a connection element will be described, which are applied especially preferably in the embodiment of a flow measuring device of the invention as a thermal flow measuring device.

The connection element in its embodiment as metal sensor housing comprises a hollow body for connecting to a plug-in apparatus and/or to a tube wall. A plug-in apparatus can be e.g. a framework, on whose end the aforementioned sensor housing is arranged. This framework is then inserted into the tube through an opening, which most often is arranged with reference to the gravitational field at the uppermost point of a tube, and secured in the opening. The external wall of the sensor housing is, thus, partially or completely exposed to a flow of the measured medium located in the tube. Alternatively to the plug-in apparatus, the metal sensor housing can also be affixed durably to a tube wall directly or by means of a tube extension. The type of placement of the sensor housing, or of the hollow body, as the case may be, is, however, only of subordinate meaning in the context of the present invention.

The aforementioned hollow body has a base area. This base area can be, for an example, flat or rounded.

The sensor housing includes at least two pin sleeves, which extend from the base area into the interior of a tube. The pin sleeves can be e.g. cylindrical or prismatic.

The metal sensor housing is embodied as one piece and the pin sleeves and the hollow body are connected seam freely together. For a long time, usual practice has been to join the pin sleeves with the hollow body and then to weld. This design has been characterized by a heat transfer, which changes with temperature change of the medium and, because of manufacturing variations, is not the same for each sensor housing. This can lead to measurement error, which varies from sensor housing to sensor housing.

The terminology, seam free, means in the context of the present invention that neither a weld seam nor an adhesive- or solder or braze seam is present as connection between the pin sleeves and the hollow body.

Advantageously, the metal sensor housing is embodied as a monolithic component. The means that the sensor housing is manufactured completely of one material. While also combinations of a number of metals or metal alloys, e.g. steel and titanium, are implementable with generative manufacturing methods, these are not preferred in the context of present invention, as compared with the monolithic embodiment.

Advantageously, each of the pin sleeves has a terminal section with a medium-contacting end face and a heater is arranged in a first of the two pin sleeves, especially in the terminal section of such pin sleeve, and a temperature sensor for ascertaining the temperature of the medium is arranged in a second of the two pin sleeves, especially in the terminal section of such pin sleeve. This embodiment describes a typical thermal flow measuring device having a heater and a temperature sensor, which are placed for the most part thermally decoupled from one another in two individual metal pin sleeves. These are often also referred to as sensor elements. Often applied as heater and as temperature sensor are two, same type, heatable, resistance thermometers, e.g. PT100 sensors, of which one resistance thermometer is actively heated and, thus, applied as heater. These sensor elements enable the flow measurement. A flow measuring device embodied in such a manner is known per se and has been sold for many years, however, the most often cylindrical pin sleeves with the corresponding heatable resistance thermometers in the previous variants of the state of the art have always been welded to the hollow body. In a preferred variant of the invention, also a plurality of heatable resistance thermometers can be introduced into one sleeve.

Advantageously, the pin sleeves of the thermal flow measuring device have, at least in the terminal section, a wall thickness of less than 0.5 mm, preferably between 0.1-0.4 mm. Very thin wall thickness means a rapid response of the sensor in the case of change of flow velocity.

A thermal flow measuring device has always a certain sensitivity to the ambient temperature. Also, an as optimal as possible heat distribution, e.g. of the heat radiated by the heater, along the metal wall of a pin sleeve is preferable. In this context, the wall thickness varies advantageously, at least in the region of the terminal section, by less than 20%, preferably by less than 10%.

A good response behavior with simultaneous good thermal decoupling between heater and temperature sensor can be achieved by making the two aforementioned pin sleeves especially thin and long. Advantageously, the terminal section of the pin sleeves exhibits a cylindrical lateral surface with a diameter d1 and the terminal section extends over a length l2, characterized in that the ratio l2/d1 is greater than or equal to 5, preferably greater than or equal to 7. Such pin sleeves, which are additionally integrated with a one piece construction and seam freely in a sensor housing, have not been known to the point in time of this invention.

For stability under pressure and chemical stability, the sensor housing is advantageously composed of steel and/or titanium and/or Hastelloy.

The sensor housing can preferably have at least three pin sleeves, thus the first, the second and preferably a third pin sleeve, which preferably extend parallel to one another. Two of the pin sleeves can be equipped, such as above described, with a heater and with a temperature sensor for ascertaining the temperature of the medium. They enable the flow measurement in manner known per se. The third sensor sleeve can likewise have a heater, preferably embodied analogously to the heater of the other two pin sleeves. For example, in the case of non-uniform soiling or corrosion of the pin sleeves, the ascertaining and/or compensation of a sensor drift is advantageously enabled. This additional pin sleeve can, in such case, likewise advantageously be constructed as one piece with the remainder of the structure and be connected seamlessly with the hollow body.

Advantageously, the sensor housing has a flow obstruction, which is arranged in such a manner relative to one of the three aforementioned pin sleeves that one of the pin sleeves, starting from when the sensor housing is flowed on from a predetermined flow direction, lies partially or completely in the flow shadow of the flow obstruction, while the other two pin sleeves are arranged removed from the flow shadow. Preferably, a heater is arranged in the third pin sleeve. This permits direction detection depending on whether the flow of the measured medium from the aforementioned flow direction and thereby the flowing on and the transport away of the heat of the heater is hindered by the flow obstruction, or whether the flow direction of the measured medium is opposite to the above mentioned flow direction. In latter case, the third pin sleeve does not lie in the flow shadow of the flow obstruction.

The flow obstruction can preferably be embodied as a prism shaped pin sleeve, e.g. with triangular cross section, which extends especially preferably in parallel with the other three pin sleeves.

The third pin sleeve and/or pin-shaped element can protrude from the base area of the hollow body into the interior of the tube or pipe and be connected seam freely with the hollow body, wherein the total length of the third pin sleeve and/or of the flow obstruction is preferably less than the total length of the first two pin sleeves. In this way, the heater in the third sensor element does not influence the flow measurement, since it is arranged on another plane perpendicular to the longitudinal axis of the sensor housing than the heater and the temperature sensor of the first two pin sleeves.

The sensor housing preferably includes an arch, which bridges over at least the first and second pin sleeves and which preferably is connected with the hollow body. This arch serves for flow guidance. The arrangement of the at least two pin sleeves can form a connecting axis, which lies in a symmetry plane. The arch lies preferably likewise in this symmetry plane and is symmetrically embodied along this symmetry plane.

In a preferred embodiment, the arch is connected seam freely with the hollow body.

The length of the terminal section amounts advantageously to at least 2 mm, preferably 3-10 mm, and the total length of a pin sleeve amounts preferably to at least 10 mm. Correspondingly long pin sleeves enable an especially good thermal decoupling.

The sensor housing of the flow measuring device of the invention can be manufactured by means of a generative manufacturing method, preferably by means of a radiation melt method. While corresponding sensor housings are also implementable via other manufacturing methods, thus e.g. by primary forming methods, especially by metal injection molding, it has been found that especially good manufacturing tolerances and especially thin walled components are obtainable with the aforementioned, preferred manufacturing methods.

BRIEF DESCRIPTION OF THE DRAWINGS

The invention will now be explained in greater detail based on an example of an embodiment for a thermal flow measuring device and with the help of the appended drawing. These descriptions and the figures are by way of example and are not intended to limit the scope of protection of the present invention. The sole FIGURE of the drawing shows as follows:

FIG. 1 shows a sectional view of a sensor housing of a thermal, flow sensor of the invention.

DETAILED DESCRIPTION

Conventional, thermal flow measuring devices usually use two, as equally as possible embodied, heatable, resistance thermometers, which are arranged in, most often, pin-shaped metal sleeves, so-called stingers, or in cylindrical metal sleeves and which are in thermal contact with the medium flowing through a measuring tube or through the pipeline. For industrial application, the two resistance thermometers are usually installed in a measuring tube. The resistance thermometers can, however, also be directly mounted in the pipeline. One of the two resistance thermometers is a so-called active sensor element, which is heated by means of a heating unit.

The heating unit is either an additional resistance heater, or in the case of the resistance thermometer is a resistance element, e.g. an RTD (Resistance Temperature Device) sensor, which is heated by conversion of an electrical power, e.g. by a corresponding variation of the measuring electrical current. In the field of thermal flow measurement, the active sensor element is also often called the heater. The second resistance thermometer is a so-called passive sensor element: It measures the temperature of the medium.

Usually, in a thermal flow measuring device, a heatable resistance thermometer is so heated that a fixed temperature difference is established between the two resistance thermometers. Alternatively, it is also known to supply a constant heating power via a control unit.

If there is no flow in the measuring tube, then an amount of heat required for maintaining the specified temperature difference is constant with time. If, in contrast, the medium to be measured is moving, the cooling of the heated resistance thermometer depends essentially on the mass flow of the medium flowing past it. Since the medium is colder than the heated resistance thermometer, heat is transported away from the heated resistance thermometer by the flowing medium. In order, thus, in the case of a flowing medium, to maintain the fixed temperature difference between the two resistance thermometers, an increased heating power is required for the heated resistance thermometer. The increased heating power is a measure for the mass flow of the medium through the pipeline. The heating power can be described by a so-called power coefficient (PC).

If, in contrast, a constant heating power is supplied, then, as a result of the flow of the medium, the temperature difference between the two resistance thermometers lessens. The particular temperature difference is then a measure for the mass flow of the medium through the pipeline, or through the measuring tube, as the case may be.

There is, thus, a functional relationship between the heating energy needed for heating the resistance thermometer and the mass flow through a pipeline, or through a measuring tube, as the case may be. The dependence of the heat transfer coefficient on the mass flow of the medium through the measuring tube, or through the pipeline, is utilized in thermal flow measuring devices for determining the mass flow. Devices, which operate on this principle, are produced and sold by the applicant under the marks, 't-switch', 't-trend' or 't-mass'.

FIG. 1 shows a variant of a thermal flow measuring device 1 of the invention in greater detail. In such case, one sees especially a housing of a measuring transducer of the thermal flow measuring device 1, which is referred to hereinafter as sensor housing 4. Sensor housing 4 is manufactured of metal and can be embodied as a plug-in sensor and be arranged, for example, in a sensor nozzle 2 of a tube 3 or in an opening of the tube 3. Tube 3 can be a measuring tube or can be part of an existing pipeline.

In addition to the measuring transducer, the thermal flow measuring device 1 also includes an evaluation unit 10, which can be built into the measuring transducer.

The sensor housing 4 to be described here for a measuring transducer represents only an especially preferred embodiment of the invention.

Sensor housing 4 includes a hollow body 13, which can be arranged directly in the sensor nozzle 2.

Hollow body 13 has a rounded base area, from which the at least two, a first and a second, pin sleeves 6 protrude into the lumen, thus into the interior, of the tube 3.

Hollow body 13 in the embodiment of FIG. 1 is dome shaped. It can, however, also have another shape and be embodied, for example, cylindrically, frustum or frusto pyramid shaped.

FIG. 1 shows two pin sleeves 6. However, also other pin sleeves, e.g. three or four pin sleeves, can be provided, in the case of which the flow measuring device can preferably combine other functionalities, e.g. drift detection and direction detection, in a thermal flow measuring device.

The present invention can in a simplified embodiment also have only the two pin sleeves 6. The pin sleeves 6 are connected with the hollow body 13 as one piece and connecting seam freely, especially in the connection region. The terminology, connecting seam, in the sense of the present invention means a weld seam, adhesive seam, solder seam, brazed seam or the like.

Especially preferably, the housing, thus the totality of pin sleeves and hollow body, is monolithically embodied.

The first and second pin sleeves 6 have, in each case, a medium-contacting end face 14. Such is shown rounded in FIG. 1; it can, however, also be embodied flat.

Each of the two pin sleeves has, especially in the region of the medium-contacting end face 14, a sensor element 5, which is arranged in the interior of its pin sleeve 6. A first sensor element 5 is, in such case, embodied as a heating element and a second sensor element 5 is embodied as a temperature sensor, for ascertaining the temperature of the medium. Both sensor elements can be in the form of a heatable temperature sensor, e.g. a Pt-100 or Pt-1000 resistance temperature sensor.

The pin sleeves 6 can, in each case, be embodied in a stepped manner, whereby a better introduction and positioning of the sensor elements 5 in the pin sleeves 6 through the terminal opening on the end of the pin sleeves 6 facing away from the medium can occur.

The pin sleeve 6 is associated with the sensor housing 4, which in the context of the present invention serves as a connection element 22, which connects the sensor elements 5 with the sensor nozzle 2.

The geometric embodiment of a pin sleeve 6 is such that, starting from the end face 14, firstly, a first section 20 with a cylindrical pin sleeve wall and a first continuous cylinder outer diameter d1 follows. At a step 15 there follows a second section 19 with a cylindrical pin sleeve wall and a second continuous cylinder outer diameter d2. The second section can also have, for example, a conical shape. In such case, the diameter d2 is an average value.

Following on the second section 19 is then a third section 16 with a conical shape. The transition between the first and second sections 19 and 20 is not abrupt, but, instead, has a continual increasing of the diameter from the first diameter d1 to a second diameter d2. The step 15 is, consequently, not abrupt, but, instead, exhibits a gradual changing of the diameter. Then, there arrives the third section 16 of the pin sleeve, which is frustoconically shaped and in the case of which the diameter d gradually grows in the course of the frustum up to a transition to the hollow body 13. The pin sleeves 6 have a length l1 of at least 10 mm.

The stepped construction of the pin sleeves advantageously provides a greater stiffness of the pin sleeves.

Associated with the section 20 according to the definition of the present invention is the end face 14. In this section 20 of a first of the two pin sleeves 6, a sensor element 5 is arranged. The sensor element, especially the heating element, does not absolutely have to contact the end face 14 or a cylindrical lateral surface of the pin sleeve, but can, instead, preferably be thermally coupled with the wall of the pin sleeve via a copper bridge. The same holds also for the additional, optional pin sleeves. A corresponding arrangement and its advantages are described in detail in DE 10 2008 015 359 A1.

Arranged in the section 20 of the second of the two pin sleeves 6 is a temperature sensor for ascertaining the temperature of the medium. This can likewise be embodied as a heatable resistance thermometer, wherein during operation of the thermal flow measuring device 1 preferably one of the resistance thermometers can be actively heated and one of the resistance thermometers can be unheated.

The wall thickness of the pin sleeves 6 amounts, at least in the section 20, to less than 0.5 mm, preferably less than or equal to 0.4 mm, especially 0.1 to 0.4 mm. Due to the thin wall thickness, an especially more favorable heat transfer can be achieved.

The length l2 of section 20 can be at least 2 mm, preferably, however, 3-10 mm.

The ratio of the length l2 to the diameter d1 for the first section 20 is preferably greater than 5, especially preferably equal to or greater than 7.

In a preferred embodiment of the invention, the average ratio $d_{average\ value}/l1$ for the total pin sleeve, amounts preferably to greater than 4, wherein the diameter applied is always that of the particular length of the section of the pin sleeve, in which the diameter is actually present. In the case of a frustum, such as in section 16, an average value of the diameter can be formed.

Sensor housing 4 is manufactured of metal. An especially preferred metal can be steel, especially stainless steel, or Hastelloy. Alternatively, e.g. for strongly-corrosive media, also titanium can be utilized as wall material.

Preferably, the sensor housing 4 is manufactured monolithically. In this way, a defined heat transfer is achieved.

Additionally, the sensor housing 4 can be provided with a metal outer coating, in order, in given cases, to increase the resistance to certain media. This outer coating according to the present invention is not, however, part of the housing 2, but, instead, is a material ply applied supplementally on the housing 4.

Sensor housing 4 is especially preferably manufacturable in a generative manufacturing method. Especially preferable, in such case, are radiation melt methods, such as e.g. selective laser melting, which is also known as the SLM method, in order to manufacture such an item with correspondingly thin wall thickness and corresponding length of the pin sleeves.

In the case of the SLM method, a metal powder can be applied in a thin layer on a surface. The metal powder is then locally completely melted by laser radiation and solidified to a solid material layer with a coating thickness of typically 15-150 μm. Then, the surface is lowered by the magnitude of the coating thickness and a new material layer deposited. In this way, the housing 4 of the measuring transducer is gradually formed. Stresses in the material and corrosion susceptible seam locations are not present in such case.

The thermal flow measuring device 1 of the invention additionally includes a pressure bearing component 7, which adjoins at an interface 21 at the hollow body 13. The pressure bearing component 7 is preferably deformation stable at least up to a maximum pressure of 40 bar.

The pressure bearing component 7 includes a sleeve 12 with a longitudinal axis A and a wall 18, which extends over the entire cross section of the sleeve 12. The sleeve can preferably have a circularly shaped or rectangular cross section. It can especially preferably have a cylindrical shape.

The surface normal of the wall 18 can preferably extend in parallel with the longitudinal axis A of the sleeve 12. The wall 18 can, however, also be arranged inclined in the sleeve 12.

The end face and the wall 18 do not absolutely have to be arranged terminally on the sleeve 12, but, instead, can also be arranged, for example, in the middle of the sleeve form of the annular wall region and extend there over the entire cross section.

Arranged in the sleeve 12 are preferably electronic components, thus e.g. boards and the like. These electronics components are embedded in a potting compound 8. The potting compound 8 fills especially the sleeve 12 partially or completely. Arranged in the wall 18 is at least one hole or a number of holes acting as electrical cable guides 9. These serve for the feedthrough of one or more signal lines and/or energy supply lines 17 between the sensor elements 5 and the evaluation unit 10. The holes can preferably have an average hole cross-section between 0.2 and 1.5 mm.

For position securement of the potting compound 8, the sleeve 12 includes on the inner side a ledge 11. Alternatively or supplementally to ledges, the sleeve 12 can have grooves and/or a screw thread for anchoring the potting compound 8. At the same time, a better sealing of the potting compound is achieved.

The wall thickness of the wall 18 has with reference to a diameter of the sleeve cross section of the sleeve 12 a ratio of preferably at least 1 to 30. Especially in the case of a dome shape of the wall 18, a lower wall thickness can be selected than in the case of a planar shape of the wall 18.

The wall thickness of the wall 18 has in the case of a planar shape with reference to a diameter of the sleeve cross section of the sleeve 12 a ratio of preferably at least 1 to 20, especially preferably at least 1 to 10.

Thus, the wall 18 can have a wall thickness of preferably at least 0.5 mm and especially preferably 1 to 2 mm.

The one or more openings, or holes, of the electrical cable guide 9 can preferably likewise be filled with potting compound 8.

The potting compound can be embodied, for example, based on an epoxide.

The sleeve 12 and the wall 18 are preferably formed of a metal and especially preferably of stainless steel or Hastelloy. The unit is preferably monolithically constructed.

In FIG. 1, the two measurement signal-generating sensor elements 5, thus the heating element and the temperature sensor, are arranged via a monolithic, connecting seam free, connection element 22 in the form of a sensor housing 4 on the tube 3, or in the sensor nozzle 2 of the tube 3, as the case may be.

Corresponding connection elements 22 are also known from the field of ultrasonic flow measuring devices and from the field of vortex flow measuring devices.

In ultrasonic flow measuring devices, it can be an element for reducing the body sound, i.e. an element which bears the ultrasound generating element, e.g. the ultrasonic transducer, and by means of which such is affixed to a tube wall. Also here, following this element for reducing the body sound, a pressure bearing component can be arranged, analogously to the component 7 of FIG. 1. This body-sound lessening element is monolithic and especially manufacturable by one of the above-described, generative manufacturing methods.

In vortex measuring devices, capacitive sensors, so-called DSC sensors, are often applied. In order to prevent mechanical deformation of a sensor paddle in the case of pressure spikes, a stop is provided. This stop can be arranged, for example, in cage or arch shape in the region of the sensor paddle and supplementally limit its movement. Also this element can be manufactured by means of a generative manufacturing method. This stop is monolithic and is especially manufacturable by one of the above-described generative manufacturing methods.

The invention claimed is:

1. A thermal flow measuring device, comprising:
   two measurement signal-generating sensor elements;
   a metal sensor housing having a hollow body and two pin sleeves protruding outward from the hollow body, wherein each sensor element is disposed at an end of a respective pin sleeve, and wherein the sensor housing is adapted to connect the sensor elements to an opening or a sensor nozzle of a tube or pipe having a tube longitudinal axis; and
   a pressure-bearing component including:
      a sleeve having a cross-section and a longitudinal axis;
      a wall extending over the entire cross-section of the sleeve in a parallel projection in a direction of the sleeve longitudinal axis;
      at least one electrical cable guide extending through the wall; and
      a potting compound filling the sleeve at least partially,
   wherein the pressure-bearing component is attached to a rear side of the sensor housing behind the two pin sleeves,
   wherein when the flow-measuring device is installed in the opening or in the sensor nozzle of the tube or pipe, the pressure bearing component is disposed in the opening or in the sensor nozzle of the tube or pipe adjacent the rear side of the sensor housing that is perpendicular to the tube longitudinal axis and such that the pressure-bearing component seals the opening or tube nozzle behind the sensor housing;
   wherein an outer diameter of the sensor housing increases from a medium-contacting end face of the pin sleeves to the hollow body.

2. The flow measuring device of claim 1, wherein the pressure-bearing component includes at least one electronic component that is embedded in the potting compound.

3. The flow measuring device of claim 1, wherein the sensor housing is manufactured by a generative manufacturing method, including by an selective laser melting method from a granular metal material or by a metal injection molding method.

4. The flow measuring device of claim 1, wherein the sensor housing is monolithically embodied.

5. The flow measuring device of claim 1, wherein the pressure-bearing component includes one or more ledges on an inner surface of the sleeve opposite the wall, the one or more ledges structured to anchor the potting compound.

6. The flow measuring device of claim 1, wherein a wall thickness of the wall relative to a diameter of the cross-section of the sleeve has a ratio of at least 1 to 30.

7. The flow measuring device of claim 1, wherein a wall thickness of the wall relative to a diameter of the cross-section of the sleeve has a ratio of at least 1 to 10.

8. The flow measuring device of claim 1, wherein the at least one electrical cable guide is embodied as a hole in the wall, the hole having. an average hole diameter of 0.2 to 1.5 mm.

9. The flow measuring device of claim 1, wherein the pressure-bearing component is embodied to be welded and/or screwed into the opening or the sensor nozzle of the tube or pipe.

* * * * *